United States Patent
Kim et al.

(10) Patent No.: US 11,495,824 B2
(45) Date of Patent: Nov. 8, 2022

(54) ELECTROLYTE FOR LITHIUM METAL BATTERY AND LITHIUM METAL BATTERY COMPRISING SAME

(71) Applicant: LG CHEM, LTD., Seoul (KR)

(72) Inventors: Kihyun Kim, Daejeon (KR); Dongseok Shin, Daejeon (KR); Doo Kyung Yang, Daejeon (KR); Sun Mi Jin, Daejeon (KR); Intae Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 305 days.

(21) Appl. No.: 16/643,819

(22) PCT Filed: Oct. 8, 2018

(86) PCT No.: PCT/KR2018/011813
§ 371 (c)(1),
(2) Date: Mar. 2, 2020

(87) PCT Pub. No.: WO2019/078526
PCT Pub. Date: Apr. 25, 2019

(65) Prior Publication Data
US 2020/0203759 A1 Jun. 25, 2020

(30) Foreign Application Priority Data

Oct. 17, 2017 (KR) .................. 10-2017-0134320
Oct. 5, 2018 (KR) .................. 10-2018-0118569

(51) Int. Cl.
*H01M 10/052* (2010.01)
*H01M 4/58* (2010.01)
(Continued)

(52) U.S. Cl.
CPC .......... *H01M 10/052* (2013.01); *H01M 4/58* (2013.01); *H01M 4/60* (2013.01); *H01M 10/0567* (2013.01); *H01M 4/40* (2013.01)

(58) Field of Classification Search
CPC ............ H01M 10/0567; H01M 4/5815
See application file for complete search history.

(56) References Cited

U.S. PATENT DOCUMENTS

| 2002/0018940 A1 | 2/2002 | Nirasawa et al. |
| 2004/0058232 A1 | 3/2004 | Kim et al. |

(Continued)

FOREIGN PATENT DOCUMENTS

| CN | 1322028 A | 11/2001 |
| CN | 102640344 A | 8/2012 |

(Continued)

OTHER PUBLICATIONS

Extended European Search Report for European Application No. 18868454.2, dated Oct. 16, 2020.

(Continued)

*Primary Examiner* — Stephan J Essex
(74) *Attorney, Agent, or Firm* — Birch, Stewart, Kolasch & Birch, LLP

(57) ABSTRACT

An electrolyte for a lithium metal battery and a lithium metal battery including the same, more specifically an electrolyte for a lithium metal battery including a lithium salt, an organic solvent and an additive, wherein the additive includes a functional group that binds to lithium metal at one end thereof and a fluorinated hydrocarbon group at the other end. The electrolyte for the lithium metal battery includes an additive including particular functional groups to improve the stability of the lithium metal and suppress the side reaction at the surface, thereby enabling the lithium metal battery to have high capacity, high stability, and long life.

9 Claims, 6 Drawing Sheets

(51) Int. Cl.
*H01M 4/60* (2006.01)
*H01M 10/0567* (2010.01)
*H01M 4/40* (2006.01)

(56) References Cited

U.S. PATENT DOCUMENTS

| | | |
|---|---|---|
| 2005/0208385 A1 | 9/2005 | Nirasawa et al. |
| 2007/0196727 A1 | 8/2007 | Wang et al. |
| 2009/0123839 A1* | 5/2009 | Soma .............. H01M 4/622 429/231.95 |
| 2009/0191465 A1 | 7/2009 | Hwang et al. |
| 2012/0141878 A1 | 6/2012 | Ohashi et al. |
| 2012/0214043 A1 | 8/2012 | Olschimke et al. |
| 2012/0231336 A1 | 9/2012 | Kim et al. |
| 2013/0052543 A1 | 2/2013 | Ihara et al. |
| 2013/0095605 A1 | 4/2013 | Goto et al. |
| 2014/0127547 A1 | 5/2014 | Park et al. |
| 2014/0295995 A1* | 10/2014 | Sullivan ............. A63B 37/0051 473/373 |
| 2015/0064578 A1 | 3/2015 | Kang et al. |
| 2016/0293997 A1 | 10/2016 | Yamauchi et al. |
| 2018/0126226 A1* | 5/2018 | Mikura ............. A63B 37/0074 |

FOREIGN PATENT DOCUMENTS

| | | |
|---|---|---|
| CN | 103782428 A | 5/2014 |
| CN | 104716381 A | 6/2015 |
| CN | 105161757 A | 12/2015 |
| CN | 105449275 A | 3/2016 |
| CN | 105655638 A | 6/2016 |
| CN | 105794034 A | 7/2016 |
| EP | 1 148 570 A2 | 10/2001 |
| JP | 7-37578 A | 2/1995 |
| JP | 2000-156245 A | 6/2000 |
| JP | 2002-8720 A | 1/2002 |
| JP | 2002-319433 A | 10/2002 |
| JP | 2004-55320 A | 2/2004 |
| JP | 2009-527096 A | 7/2009 |
| JP | 2013-508927 A | 3/2013 |
| JP | 2014-137843 A | 7/2014 |
| JP | 2014-531720 A | 11/2014 |
| JP | 2016-191102 A | 11/2016 |
| JP | 2017-4691 A | 1/2017 |
| JP | 2017-4692 A | 1/2017 |
| KR | 10-2001-0098848 A | 11/2001 |
| KR | 10-0413796 B1 | 1/2004 |
| KR | 10-2004-0026208 A | 3/2004 |
| KR | 10-0485092 B1 | 4/2005 |
| KR | 10-2009-0081880 A | 7/2009 |
| KR | 10-2012-0027277 A | 3/2012 |
| KR | 10-2012-0101970 A | 9/2012 |
| KR | 10-2013-0021439 A | 3/2013 |
| KR | 10-2013-0079126 A | 7/2013 |
| KR | 10-2014-0030043 A | 3/2014 |
| KR | 10-2014-0125970 A | 10/2014 |
| KR | 10-2016-0034183 A | 3/2016 |
| KR | 10-1601066 B1 | 3/2016 |
| KR | 1601066 B1 * | 3/2016 .......... H01M 10/052 |
| KR | 10-2016-0052351 A | 5/2016 |

OTHER PUBLICATIONS

International Search Report for PCT/KR2018/011813 (PCT/ISA/210) dated Mar. 22, 2019.

Qian et al., "High rate and stable cycling of lithium metal anode", Nature Communications, vol. 6, Article No. 6362, Published Feb. 20, 2015, pp. 1-9.

* cited by examiner

ELECTROLYTE FOR LITHIUM METAL BATTERY AND LITHIUM METAL BATTERY COMPRISING SAME

TECHNICAL FIELD

The present application claims the benefits of Korean Patent Application No. 10-2017-0134320 filed on Oct. 17, 2017 with the Korean Intellectual Property Office and Korean Patent Application No. 10-2018-0118569 filed on Oct. 5, 2018 with the Korean Intellectual Property Office, the disclosure of which are herein incorporated by reference in their entirety.

The present invention relates to an electrolyte for a lithium metal battery and a lithium metal battery comprising the same.

BACKGROUND ART

With the rapid development of the electrical, electronic, communication and computer industries, the demand for the secondary battery with high performance and high stability is increasing rapidly. Particularly, the weight reduction and miniaturization for the secondary battery, which is a core part, are also required, in accordance with the trend of weight reduction, thinning, miniaturization and portability of batteries and electronic products. In addition, as the need for a new type of energy supply source has arisen due to environmental pollution problems and oil depletion, there has been an increasing need to develop electric vehicles capable of addressing such need. Among secondary batteries, a lithium secondary battery which has a long cycle life, is lightweight and exhibits high energy density and operating potential is in the spotlight recently.

The lithium secondary battery has a structure in which an electrode assembly comprising a positive electrode, a negative electrode and a separator interposed between the positive electrode and the negative electrode are laminated or wound, and the lithium secondary battery is composed by embedding this electrode assembly in the battery case and injecting a non-aqueous electrolyte into the inside thereof. In that case, the capacities of lithium secondary batteries differ depending on the type of electrode active materials and the capacity at the time of actual driving cannot be secured by a sufficient capacity as much as the theoretical capacity, and thus such batteries have not been commercialized.

In order to obtain a lithium secondary battery with high capacity, metallic materials having high storage capacity characteristics through the alloying reaction with lithium, such as silicon (4,200 mAh/g) and tin (990 mAh/g) are used as the negative electrode active material. However, when the metals such as silicon and tin are used as a negative electrode active material, the volume expands by about 4 times in the charging process, which performs the alloying with lithium, and shrinks in the discharging process. Due to the large volume changes of the electrode that occur repeatedly during the charging/discharging processes, the active materials were gradually micronized and dropped off from the electrode, and thus, the capacity was rapidly reduced, thereby making it difficult to ensure stability and reliability and thus failing commercialization.

Since lithium metal has an excellent theoretical capacity of 3,860 mAh/g and a low potential with respect to standard hydrogen electrode (SHE) of −3.045 V as compared to the negative electrode active material mentioned above, and thus enables the implementation of batteries with high capacity and high energy density, there are many studies on lithium metal batteries (LMB) using lithium metal as a negative electrode active material for the lithium secondary battery.

However, in the case of lithium metal battery, the lithium metal reacts easily with electrolyte, impurities, and lithium salts due to its high chemical/electrochemical reactivity and forms a solid electrolyte interphase (SEI) on the surface of the electrode, and such a solid electrolyte interphase induces a localized current density difference to form dendrites on the surface of lithium metal. The lithium dendrite not only shortens the life of the lithium secondary battery but also induces short circuit and dead lithium in the battery to increase the physical and chemical instability of the lithium secondary battery, reduce the capacity of the battery, reducing the cycling life, and adversely affects the stability of the battery. In addition, the solid electrolyte interphase is thermally unstable, so that the charging/discharging process of the battery can be continuously proceeded, or the solid electrolyte interphase can be slowly collapsed by increased electrochemical energy and thermal energy, especially during high temperature storage in a fully charged state. Due to the collapse of the solid electrolyte interphase, a side reaction in which the exposed surface of lithium metal is decomposed by direct reaction with the electrolyte solvent is continuously generated, and thus the resistance of the negative electrode is increased, and the charging/discharging efficiency of the battery is lowered. Also, there are problems that the solvent of the electrolyte is consumed during the formation of the solid electrolyte interphase, and the life of the battery is reduced due to the by-products, gas, and the like generated during various side reactions such as the formation and collapse of the solid electrolyte interphase and the decomposition of the electrolyte.

The lithium metal battery using lithium metal as a negative electrode is not commercialized because of the high instability of lithium metal.

In order to solve these problems, various methods such as a method of introducing a protective layer on the surface of lithium metal or a method of changing the composition of an electrolyte have been studied.

For example, Korean Patent Application Publication No. 2016-0034183 discloses that the loss of electrolyte solution and the generation of dendrites can be prevented by forming a protective layer with a polymer matrix, which can protect the negative electrode and accumulate the electrolyte, on the negative electrode active layer containing lithium metal or lithium alloy.

In addition, Korean Patent Application Publication No. 2016-0052351 discloses that the stability and life characteristics of the lithium secondary battery can be improved by incorporating a lithium dendrite-absorbing material into the polymeric protective film formed on the surface of lithium metal and thus suppressing the growth of the lithium dendrites.

In addition, each of Jiangfeng Qian et al. and Korean Patent Application Publication No. 2013-0079126 discloses that the characteristics of the lithium metal battery can be improved by increasing the concentration of lithium salts or by incorporating a non-aqueous organic solvent including 1,3,5-trioxane, 1,3-dioxolane and fluorine-based cyclic carbonate.

These prior documents have stabilized the surface of lithium metal and thus inhibited the side reaction between the electrolyte and lithium metal to some extent, but the effect was not sufficient. In addition, the protective layer becomes hard during the charging/discharging process of the battery, or when the protective layer comes into contact with the electrolyte, deformation such as swelling occurs, and thus, application to the lithium secondary battery is limited. In addition, the use of the electrolyte having a specific composition may cause deterioration of battery performance. Accordingly, it is necessary to develop a technique for stabilizing the interface of lithium metal, which is a negative electrode in the lithium metal battery.

PRIOR ART DOCUMENT

Patent Document

Korean Patent Application Publication No. 2016-0034183 (Mar. 29, 2016), NEGATIVE ELECTRODE FOR RECHARGEABLE LITHIUM BATTERY AND RECHARGEABLE LITHIUM BATTERY COMPRISING SAME, Korean Patent Application Publication No. 2016-0052351 (May 12, 2016), LITHIUM METAL ELECTRODE FOR LITHIUM SECONDARY BATTERY WITH SAFE PROTECTIVE LAYER AND LITHIUM SECONDARY BATTERY COMPRISING THE SAME, Korean Patent Application Publication No. 2013-0079126 (Jul. 10, 2013), ELECTROLYTE FOR LITHIUM METAL BATTERY AND LITHIUM METAL BATTERY INCLUDING THE SAME.

[Non-Patent Document]

Jiangfeng Qian et al., High rate and stable cycling of lithium metal anode, *Nature Communications*, 2015, 6, 6362.

DISCLOSURE

Technical Problem

As a result of various studies to solve the above problems, the inventors of the present invention have identified that when an additive including specific functional groups is comprised in the electrolyte for the lithium metal battery, the electrochemical characteristics and stability of the lithium metal electrode are improved, thereby improving the capacity and life of the battery, and thus have completed the present invention. Accordingly, it is an object of the present invention to provide an electrolyte for a lithium metal battery having excellent capacity and life characteristics.

Also, it is another object of the present invention to provide a lithium metal battery comprising the above electrolyte.

Technical Solution

According to an aspect of the present invention, provided an electrolyte for a lithium metal battery comprising a lithium salt, an organic solvent and an additive, wherein the additive may comprise a functional group capable of binding to lithium metal at one end thereof and a fluorinated hydrocarbon group at the other end.

The functional group capable of binding to lithium metal may comprise at least one selected from the group consisting of a thiol group, an amine group and a hydroxy group.

The additive may be represented by the following Formula 1:

[Formula 1]

wherein A, B, O, X, m and n are as described in the specification.

The additive may comprise at least one selected from the group consisting of 1H,1H,2H,2H,3H,3H-perfluoroundecylthiol, 1H,1H,2H,2H-perfluorodecanethiol, 1H,1H,2H,2H-perfluorononanethiol, 1H,1H,2H,2H-perfluoro-1-octanethiol, 1H,1H-perfluorooctylthiol, 1H,1H-perfluoropropylthiol, 2,2,2-trifluoroethanethiol, 1H,1H,2H,2H-perfluoro-1-hexanethiol, 2,3,4,5,6-pentafluorothiophenol, 2,3,5,6-tetrafluorobenzenethiol, 2,4-difluorothiophenol, 3,4-difluorothiophenol, 2-fluorothiophenol, 3-fluorothiophenol, 4-fluorothiophenol, 2-(trifluoromethoxy)thiophenol, 3-(trifluoromethoxy)thiophenol, 2-(trifluoromethyl)benzenethiol, 2,6-difluorobenzyl mercaptan, 3,4-difluorobenzyl mercaptan, 3,5-difluorobenzyl mercaptan, 4-fluorobenzyl mercaptan, 3,5-bis(trifluoromethyl)benzenethiol, 4-trifluoromethylbenzyl mercaptan, 1H,1H-perfluorooctylamine, 1H,1H-heptafluorobutylamine, 1H,1H-perfluorononylamine, 4-(1H,1H,2H,2H-perfluorodecyl)benzylamine, 2,2,3,3,4,4,4-heptafluorobutylamine, 2,2,3,3,3-pentafluoropropylamine, 3,3,3-trifluoropropylamine, 4-fluoro-α-methylbenzyl alcohol, 2-fluoro-3-methylbenzyl alcohol, 4-fluoro-3-methylbenzyl alcohol, 5-fluoro-2-methylbenzyl alcohol, 4-fluoro-3-nitrobenzyl alcohol, 2-fluoro-5-nitrobenzyl alcohol, 2-fluoro-3-(trifluoromethoxy)benzyl alcohol, 2-fluoro-3-nitrobenzyl alcohol, 2-fluoro-5-methoxybenzyl alcohol, 3-fluoro-5-(trifluoromethyl)benzyl alcohol, 3-fluoro-5-methoxybenzyl alcohol, 4-fluoro-3-(trifluoromethyl)benzyl alcohol, 4-fluoro-3-methoxybenzyl alcohol, 5-fluoro-2-(trifluoromethyl)benzyl alcohol, 5-fluoro-2-nitrobenzyl alcohol, DL-4-fluoro-α-propylbenzyl alcohol, 3-fluorobenzyl alcohol and 4-fluorophenethyl alcohol.

The additive may be comprised in an amount of from 0.01 to 5% by weight, based on the total weight of the electrolyte for the lithium metal battery.

According to another aspect of the present invention, there is provided a lithium metal battery comprising the electrolyte. The lithium metal battery may include a positive electrode including a positive electrode active material, a negative electrode including lithium metal or lithium alloy, and the electrolyte. The positive electrode active material may include at least one selected from the group consisting of an elemental sulfur and a sulfur-containing compound.

Advantageous Effects

The electrolyte of the lithium metal battery according to the present invention enables the lithium metal battery to have high capacity and long life by comprising an additive that includes a functional group capable of binding to lithium metal at one end thereof and a fluorinated hydrocarbon group at the other end, and thus improving the stability of lithium metal and at the same time, suppressing side reactions at the surface of lithium metal.

BEST MODE

Figure 1:
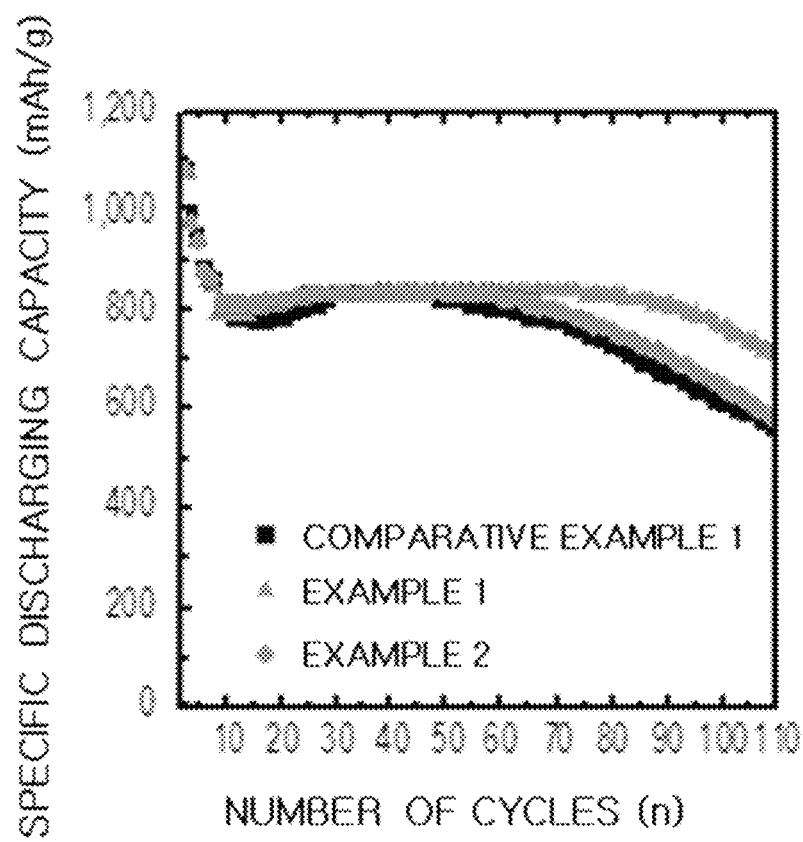
FIG. 1 is a graph showing the results of performance evaluations of the batteries manufactured in Example 1 and Example 2 of the present invention and Comparative Example 1.

Hereinafter, the present invention will be described in more detail.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used herein is for the purpose of describing particular embodiments only and is not intended to be limiting of the invention. The singular forms "a", "an" and "the" comprise plural referents unless the context clearly dictates otherwise. It is to be understood that the terms such as "comprise" or "have" as used in the present specification, are intended to designate the presence of stated features, numbers, steps, operations, components, parts or combinations thereof, but not to preclude the possibility of the presence or addition of one or more other features, numbers, steps, operations, components, parts, or combinations thereof.

For the lithium metal battery, the lithium metal used as the negative electrode active material has a high energy density (3,860 mAh/g) while having low oxidation/reduction potential (−3.045 V vs. standard hydrogen electrode) and atomic weight (6.94 g/a.u.). Therefore, since it is possible to achieve a high capacity and a high energy density while enabling miniaturization and weight reduction, the lithium metal battery is attracting attention as a next-generation battery.

However, as described above, lithium metal has high reactivity and thus is very weak in terms of stability. Also, when sulfur-based materials are used as positive electrode active material, among lithium polysulfide ($Li_2S_x$, x=8, 6, 4, 2) formed in the positive electrode during the operation of the battery, lithium polysulfide ($Li_2S_x$, usually x>4), which has the high oxidation number of sulfur, has a high solubility in the electrolyte including a hydrophilic organic solvent and thus is continuously dissolved therein and released outside the reaction zone of the positive electrode, thereby moving to the negative electrode. At this time, the lithium polysulfide released from the positive electrode causes a side reaction with the lithium metal, and thus the lithium sulfide adheres to the surface of lithium metal. Therefore, there are problems that the reaction activity and potential characteristics are deteriorated and the lowering of the efficiency and life of the lithium metal electrode is accelerated.

In the prior art, methods such as a method of introducing a polymer protective layer or an inorganic solid protective layer on the surface of lithium metal or a method of changing the composition of an electrolyte have been used in order to prevent these problems, but the stability of the lithium metal electrode was not effectively improved.

Therefore, in order to improve the stability of the lithium metal electrode and secure the effect of improving the performance and life of the lithium metal battery including it, the present invention provides an electrolyte for a lithium metal battery comprising an additive including specific functional groups.

Specifically, the electrolyte for the lithium metal battery according to the present invention comprises a lithium salt, an organic solvent and an additive, wherein the additive comprises a functional group capable of binding to lithium metal at one end thereof and a fluorinated hydrocarbon group at the other end.

In the present invention, the additive may form a stable protective film on the surface of the lithium metal electrode by forming a bond with lithium metal through the functional group capable of binding to lithium metal located at one end, which comprises a fluorinated hydrocarbon group at the other end of the additive. In that case, the fluorinated hydrocarbon groups originated from the above additive can block the reaction of lithium metal and lithium salts or other impurities in the lithium metal battery using lithium metal or lithium alloys as a negative electrode and thus can increase the reaction efficiency of lithium, thereby improving the discharge amount and extending the life.

In particular, when the lithium metal battery of the present invention is a lithium-sulfur battery including sulfur as a positive electrode active material, the protective layer formed from the additive can prevent the lithium polysulfide generated from the positive electrode from reacting with lithium metal, thereby effectively suppressing the overcharge phenomenon of the battery and thus enhancing the stability of the battery.

In addition, since the additive of the present invention can be used in the electrolyte to form the above-described protective film on the lithium metal electrode through an in-situ reaction with lithium metal during the operation of the battery, there is an advantage that a process for forming a separate layer as in the prior art is not necessary.

In the present invention, the additive may be represented by the following Formula 1:

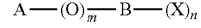

[Formula 1]

$$A-(O)_{\overline{m}}-B-(X)_n$$

wherein A is an alkyl group having 1 to 20 carbon atoms which is substituted or unsubstituted with fluorine; an alkenyl group having 2 to 20 carbon atoms which is substituted or unsubstituted with fluorine; an alkynyl group having 2 to 20 carbon atoms which is substituted or unsubstituted with fluorine; a cycloalkyl group having 3 to 20 carbon atoms which is substituted or unsubstituted with fluorine; or an aryl group having 6 to 40 carbon atoms which is substituted or unsubstituted with fluorine, B is a single bond; an alkanediyl group having 1 to 10 carbon atoms which is substituted or unsubstituted with fluorine; an alkenediyl group having 2 to 10 carbon atoms which is substituted or unsubstituted with fluorine; an unsubstituted alkynediyl group having 2 to 10 carbon atoms; a cycloalkyl group having 3 to 20 carbon atoms which is substituted or unsubstituted with fluorine; or an arylene group having 6 to 40 carbon atoms which is substituted or unsubstituted with fluorine, at least one of A and B is substituted with fluorine, O is oxygen, X is independently selected from a thiol group, an amine group or a hydroxy group, m is 0 or 1, and n is an integer of 1 to 3.

The term "hydrocarbon group" as used in the present invention refers to all organic groups consisting of carbon and hydrogen and may comprise any known structures such as an alkyl group, an alkenyl group, an alkynyl group, an aryl group, an aralkyl group, a heteroaryl group, and the like. The carbon in the hydrocarbon group may be replaced with at least one selected from the group consisting of oxygen (O), nitrogen (N), and sulfur (S). The hydrocarbon group comprises straight chain, branched chain, monocyclic or polycyclic groups, and at least one hydrogen atom contained in the hydrocarbon group is optionally substituted with one or more substituents (e.g., alkyl, alkenyl, alkynyl, heterocyclic, aryl, heteroaryl, acyl, oxo, imino, thiooxo, cyano, isocyano, amino, azido, nitro, hydroxyl, thiol, halo and the like)

The term "alkyl group" used in the present invention may be a straight chain or branched chain, and the number of carbon atoms is not particularly limited, but is preferably 1 to 20, specifically 1 to 10. Specific examples thereof comprise, but are not limited to, methyl group, ethyl group, propyl group, isopropyl group, butyl group, t-butyl group, pentyl group, hexyl group and heptyl group.

The term "alkenyl group" used in the present invention refers to a hydrocarbon group having 2 to 20 carbon atoms and including at least one carbon-carbon double bond unless otherwise stated, but is not limited thereto.

The term "alkynyl group" used in the present invention refers to a hydrocarbon group having 2 to 20 carbon atoms and including at least one carbon-carbon triple bond unless otherwise stated, but is not limited thereto.

The term "cycloalkyl group" as used in the present invention refers to a non-aromatic carbon-based ring having at least 3 carbon atoms. The cycloalkyl group comprises, but is not limited to, cyclopropyl, cyclobutyl, cyclopentyl, cyclohexyl, and the like.

The term "aryl group" used in the present invention refers to a single or multiple aromatic carbon-based ring having 6 to 20 carbon atoms. Examples thereof comprise, but are not limited to, phenyl group, biphenyl group, fluorene group and the like.

The term "alkanediyl" as used in the present invention is a divalent atomic group obtained by subtracting two hydrogen atoms from an alkane, and may be represented by the general formula $—C_nH_{2n}—$.

The term "alkenediyl" as used in the present invention is a divalent atomic group obtained by subtracting two hydrogen atoms from an alkene, and may be represented by the general formula $—C_nH_n—$.

The term "alkynediyl" as used in the present invention is a divalent atomic group obtained by subtracting two hydrogen atoms from an alkyne.

The term "arylene group" used in the present invention means a divalent aromatic carbon-based ring, and its carbon number may be 6 to 40, specifically 6 to 20. The arylene group may comprise a structure in which two or more rings are condensed or bonded, and the other rings may be aromatic, non-aromatic, or a combination thereof. For example, the arylene group comprises, but is not limited to, phenylene, biphenylene, naphthylene, anthracenylene, and the like.

The term "single bond" used in the present invention refers to a bonding relationship between elements connected with B in the case where B in the above Formula 1 does not exist.

In the Formula 1, A may represent a monovalent hydrocarbon group substituted by at least one fluorine. Preferably, A may be an alkyl group having 1 to 10 carbon atoms which is substituted or unsubstituted with fluorine; an alkenyl group having 2 to 10 carbon atoms which is substituted or unsubstituted with fluorine; an alkynyl group having 2 to 10 carbon atoms which is substituted or unsubstituted with fluorine; a cycloalkyl group having 3 to 15 carbon atoms which is substituted or unsubstituted with fluorine; or an aryl group having 6 to 20 carbon atoms which is substituted or unsubstituted with fluorine, more preferably, an alkyl group having 1 to 10 carbon atoms which is substituted or unsubstituted with fluorine.

In the Formula 1, B may represent a single bond or a divalent hydrocarbon group substituted by at least one fluorine. Preferably, B may be an alkanediyl group having 1 to 5 carbon atoms which is substituted or unsubstituted with fluorine; an alkenediyl group having 2 to 5 carbon atoms which is substituted or unsubstituted with fluorine; or an unsubstituted alkynediyl group having 2 to 10 carbon atoms, more preferably an alkanediyl group having 1 to 5 carbon atoms which is substituted or unsubstituted with fluorine.

In these cases, X may be a functional group capable of binding to lithium metal. X may comprise a polar functional group so as to dissolve well in the electrolyte and at the same time to facilitate easy bonding with the surface of the lithium metal. Preferably, X may be at least one selected from the group consisting of a thiol group (—SH), an amine group (—NH$_2$) and a hydroxy group (—OH), more preferably a thiol group.

Also, from the viewpoint of improving the stability and effectively suppressing side reactions by being stably introduced onto the surface of lithium metal, the sum of the carbon numbers of A and B may be 1 to 30.

The additive represented by the Formula 1 may be, for example, at least one selected from the group consisting of 1H,1H,2H,2H,3H,3H-perfluoroundecylthiol, 1H,1H,2H,2H-perfluorodecanethiol, 1H,1H,2H,2H-perfluorononanethiol, 1H,1H,2H,2H-perfluoro-l-octanethiol, 1H,1H-perfluorooctylthiol, 1H,1H-perfluoropropylthiol, 2,2,2-trifluoroethanethiol, 1H,1H,2H,2H-perfluoro-1-hexanethiol, 2,3,4,5,6-Pentafluorothiophenol, 2,3,5,6-tetrafluorobenzenethiol, 2,4-difluorothiophenol, 3,4-difluorothiophenol, 2-fluorothiophenol, 3-fluorothiophenol, 4-fluorothiophenol, 2-(trifluoromethoxy)thiophenol, 3-(trifluoromethoxy)thiophenol, 2-(trifluoromethyl)benzenethiol, 2,6-difluorobenzyl mercaptan, 3,4-difluorobenzyl mercaptan, 3,5-difluorobenzyl mercaptan, 4-fluorobenzyl mercaptan, 3,5-bis(trifluoromethyl)benzenethiol, 4-trifluoromethylbenzyl mercaptan, 1H,1H-perfluorooctylamine, 1H,1H-heptafluorobutylamine, 1H,1H-perfluorononylamine, 4-(1H,1H,2H,2H-perfluorodecyl)benzylamine, 2,2,3,3,4,4,4-heptafluorobutylamine, 2,2,3,3,3-pentafluoropropylamine, 3,3,3-trifluoropropylamine, 4-fluoro-α-methylbenzyl alcohol, 2-fluoro-3-methylbenzyl alcohol, 4-fluoro-3-methylbenzyl alcohol, 5-fluoro-2-methylbenzyl alcohol, 4-fluoro-3-nitrobenzyl alcohol, 2-fluoro-5-nitrobenzyl alcohol, 2-fluoro-3-(trifluoromethoxy)benzyl alcohol, 2-fluoro-3-nitrobenzyl alcohol, 2-fluoro-5-methoxybenzyl alcohol, 3-fluoro-5-(trifluoromethyl)benzyl alcohol, 3-fluoro-5-methoxybenzyl alcohol, 4-fluoro-3-(trifluoromethyl)benzyl alcohol, 4-fluoro-3-methoxybenzyl alcohol, 5-fluoro-2-(trifluoromethyl)benzyl alcohol, 5-fluoro-2-nitrobenzyl alcohol, DL-4-fluoro-α-propylbenzyl alcohol, 3-fluorobenzyl alcohol and 4-fluorophenethyl alcohol, and preferably, may be at least one selected from the group consisting of 1H,1H,2H,2H,3H,3H-perfluoroundecylthiol, 1H,1H,2H,2H-perfluoro-1-hexanethiol, 1H,1H,2H,2H-perfluorodecanethiol, 1H,1H,2H,2H-perfluorononanethiol, 1H,1H,2H,2H-perfluoro-1-octanethiol, 1H,1H-perfluorooctylthiol and 1H,1H-perfluorooctylamine, and more preferably, may be at least one selected from the group consisting of 1H,1H,2H,2H-perfluoro-1-hexanethiol, 1H,1H,2H,2H-perfluorodecanethiol, 1H,1H,2H,2H-perfluorononanethiol and 1H,1H,2H,2H-perfluoro-1-octanethiol.

The additive may be included in an amount of from 0.01 to 5% by weight, preferably from 0.05 to 1% by weight, based on the total weight of the electrolyte for the lithium metal battery. When the content of the additive is less than the above range, the protective film is not uniformly formed on the surface of the lithium metal electrode and thus the desired effect cannot be obtained. On the contrary, when the content of the additive exceeds the above range, an unnecessary reaction may occur when driving the battery, so that the performance of the battery may be deteriorated.

The electrolyte for the lithium metal battery of the present invention comprises a lithium salt as an electrolyte salt. The lithium salt is not particularly limited in the present invention and can be used without limitation as long as it is commonly used in the electrolyte for the lithium secondary battery.

For example, the lithium salt may comprise at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, lithium chloroborane, lithium lower aliphatic carboxylate having 4 or less carbon atoms, 4-phenyl lithium borate, and lithium imide. Preferably, the lithium salt may be Lithium bis(trifluoromethanesulfonyl)imide (LiTFSI), (CF$_3$SO$_2$)$_2$NLi).

The concentration of the lithium salt may be appropriately determined in consideration of ion conductivity, solubility and the like, and may be, for example, from 0.1 to 4.0 M, preferably from 0.5 to 2.0 M. When the concentration of the lithium salt is less than the above range, it is difficult to ensure ion conductivity suitable for driving the battery. On the contrary, when the concentration exceeds the above range, the viscosity of the electrolyte solution is increased to lower the mobility of the lithium ion and the decomposition reaction of the lithium salt itself may increase to deteriorate the performance of the battery. Therefore, the concentration is adjusted appropriately within the above range.

The electrolyte for the lithium metal battery of the present invention comprises an organic solvent, and those commonly used in the electrolyte for the lithium secondary battery can be used without limitation.

For example, as the organic solvent, ether, ester, amide, linear carbonate, cyclic carbonate, etc. may be used alone or in combination of two or more. Among them, ether-based compounds may be typically comprised.

For example, the ether-based compound may comprise, but is not limited to, at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, polyethylene glycol methylethyl ether, 1,3-dioxolane, tetrahydrofuran, and 2-methyltetrahydrofuran.

Examples of the ester of the organic solvent may comprise, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, 94-valerolactone, and ε-caprolactone, or a mixture of two or more thereof.

Specific examples of the linear carbonate compound may comprise, but is not limited to, at least one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more thereof.

In addition, specific examples of the cyclic carbonate compound may comprise at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a mixture of two or more thereof. Examples of such halides comprise, but are not limited to, fluoroethylene carbonate (FEC) and the like.

In addition to the above-mentioned organic solvents, there are N-methyl pyrrolidone, dimethyl sulfoxide, sulfolane and the like.

The electrolyte for the lithium secondary battery of the present invention may further comprise nitric acid-based compounds commonly used in the related art in addition to the above-mentioned components. Examples thereof may be lithium nitrate (LiNO$_3$), potassium nitrate (KNO$_3$), cesium nitrate (CsNO$_3$), magnesium nitrate (Mg)NO$_3$)$_2$), barium nitrate (Ba(NO$_3$)$_2$), lithium nitrite (LiNO$_2$), potassium nitrite (KNO$_2$), cesium nitrite (CsNO$_2$) and the like.

The electrolyte for the lithium metal battery according to the present invention including the above-mentioned components can improve the instability of the negative electrode, lithium metal, by including the additive represented by the Formula 1. Also, it is possible to effectively suppress the side reaction between the lithium metal and the material generated during the operation of the battery, such as lithium polysulfide, in the electrolyte or particularly the lithium-sulfur battery, thereby ensuring excellent stability and thus improving the performance and lifetime of the charging/discharging process of the battery.

Also, the present invention provides a lithium metal battery comprising the electrolyte for the lithium metal battery.

The lithium-sulfur battery comprises a positive electrode, a negative electrode and an electrolyte interposed between the positive electrode and the negative electrode wherein the electrolyte comprises the electrolyte for the lithium metal battery according to the present invention.

The positive electrode may comprise a positive electrode current collector and a positive electrode active material coated on one or both sides of the positive electrode current collector.

The positive electrode current collector supports the positive electrode active material and is not particularly limited as long as it has high conductivity without causing chemical change in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding force with the positive electrode active material by having fine irregularities on its surface, and may be formed in various forms such as film, sheet, foil, mesh, net, porous body, foam or nonwoven fabric.

The positive electrode active material may comprise a positive electrode active material and optionally a conductive material and a binder.

The positive electrode active material may comprise at least one selected from the group consisting of elemental sulfur ($S_8$), $Li_2S_n$($n \geq 1$), disulfide compound such as 2,5-dimercapto-1,3,4-thiadiazole and 1,3,5-trithiocyanuic acid, an organic sulfur compound or a carbon-sulfur polymer (($C_2S_x)_n$: x=2.5~50, n≥2) and the like. Preferably, inorganic sulfur ($S_8$) may be used.

The positive electrode may further comprise at least one additive selected from a transition metal element, a group IIIA element, a group IVA element, a sulfur compound of these elements, and an alloy of these elements and sulfur, in addition to the positive electrode active material.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg and the like, and the group IIIA element may comprise Al, Ga, In, Ti and the like, and the group IVA element may comprise Ge, Sn, Pb, and the like.

The conductive material is intended to improve electrical conductivity and is not particularly limited as long as it is an electron conductive material that does not cause chemical change in the lithium secondary battery.

Generally, carbon black, graphite, carbon fiber, carbon nanotube, metal powder, conductive metal oxide, organic conductive material and the like may be used. Products that are currently marketed as conductive materials may comprise acetylene black series (products from Chevron Chemical Company or Gulf Oil Company), Ketjen Black EC series (products from Armak Company), Vulcan XC-72(a product from Cabot Company) and Super P (a product from MMM). Examples thereof may comprise acetylene black, carbon black, graphite and the like.

In addition, the positive electrode active material may further comprise a binder having a function of holding the positive electrode active material on the positive electrode current collector and connecting between active materials. As the binder, for example, various types of binders such as polyvinylidene fluoride-hexafluoropropylene (PVDF-co-HFP), polyvinylidene fluoride (PVDF), polyacrylonitrile, polymethyl methacrylate, styrene-butadiene rubber (SBR), carboxyl methyl cellulose (CMC), poly(acrylic acid) (PAA), poly(vinyl alcohol) (PVA) and the like may be used.

The negative electrode may comprise a negative electrode current collector and a negative electrode active material on the negative electrode current collector, or the negative electrode may be a lithium metal plate.

The negative electrode current collector is for supporting a negative electrode active material and is not particularly limited as long as it is electrochemically stable in the voltage range of the lithium secondary battery while having excellent conductivity. For example, copper, stainless steel, aluminum, nickel, titanium, palladium, sintered carbon; copper or stainless steel surface-treated with carbon, nickel, silver or the like; aluminum-cadmium alloy or the like may be used as the negative electrode current collector.

The negative electrode current collector can enhance the bonding force with the negative electrode active material by having fine irregularities formed on its surface, and may be formed in various forms such as film, sheet, foil, mesh, net, porous body, foam or nonwoven fabric.

The negative electrode active material may comprise a material capable of reversibly intercalating or deintercalating lithium ion ($Li^-$), a material capable of reversibly forming lithium containing compounds by reacting with lithium ion, or lithium metal or lithium alloy. The material capable of reversibly intercalating or deintercalating lithium ion ($Li^+$) may be, for example, crystalline carbon, amorphous carbon, or a mixture thereof. The material capable of reacting with lithium ion ($Li^+$) to reversibly form lithium containing compounds may be, for example, tin oxide, titanium nitrate or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn). Preferably, the negative electrode active material may be lithium metal, and specifically may be in the form of a lithium metal thin film or lithium metal powder.

The method for forming the negative electrode active material is not particularly limited, and a layer or film forming method commonly used in the art can be used. For example, methods such as compression, coating, or deposition may be used. In addition, a metal lithium thin film formed on a metal plate by initial charging after assembling the battery without the lithium thin film in the current collector is also comprised in the negative electrode of the present invention.

The electrolyte comprises lithium ions and is for causing an electrochemical oxidation or reduction reaction between the positive electrode and the negative electrode through these lithium ions, and is as described above.

The injection of the electrolyte solution may be performed at an appropriate stage of the electrochemical device manufacturing process depending on the manufacturing process and required properties of the final product. That is, the injection of the electrolyte solution may be applied before assembling the electrochemical device or in the final stage of assembling the electrochemical device.

A separator may be additionally comprised between the positive electrode and the negative electrode. The separator is used to physically separate both electrodes in the lithium secondary battery of the present invention, and may be used without any particular limitations as long as it is commonly used as a separator in the lithium secondary battery. Particularly, it is desirable to use a separator having excellent wettability to the electrolyte solution while having low resistance to ion migration of the electrolyte.

The separator may be formed of a porous substrate, and the porous substrate may be any porous substrate commonly used in an electrochemical device. For example, a polyolefin-based porous membrane or a nonwoven fabric may be used as the porous substrate, but it is not particularly limited thereto.

Examples of the polyolefin-based porous membrane may comprise a membrane formed of polyolefin-based polymer such as polyethylene such as high-density polyethylene, linear low-density polyethylene, low density polyethylene and ultra-high molecular weight polyethylene, polypropylene, polybutylene and polypentene alone or a mixture thereof.

The nonwoven fabric may comprise, in addition to the polyolefin-based nonwoven fabric, for example, a nonwoven fabric formed of polyethyleneterephthalate, polybutyleneterephthalate, polyester, polyacetal, polyamide, polycarbonate, polyimide, polyetheretherketone, polyethersulfone, polyphenyleneoxide, polyphenylene sulfide and polyethylenenaphthalate alone or a mixture thereof. The structure of the nonwoven fabric may be a spun bond nonwoven fabric or a melt blown nonwoven fabric composed of long fibers.

The thickness of the porous substrate is not particularly limited, but may be from 1 to 100 μm, preferably from 5 to 50 μm.

The size and porosity of the pores present in the porous substrate are also not particularly limited, but may be from 0.001 to 50 μm and from 10 to 95%, respectively.

The lithium-sulfur battery according to the present invention may be manufactured by lamination, stacking and folding processes of the separator and the electrodes, in addition to the usual winding process.

The shape of the lithium-sulfur battery is not particularly limited, and may be various shapes such as a cylindrical shape, a laminate shape and a coin shape.

Also, the present invention provides a battery module including the lithium metal battery as a unit battery.

The battery module may be used as a power source for medium to large-sized devices requiring high temperature stability, long cycle characteristics, high capacity characteristics and the like.

Examples of such medium to large-sized devices may comprise, but is not limited to, a power tool powered by an electric motor; an electric car including an electric vehicle (EV), a hybrid electric vehicle (HEV), a plug-in hybrid electric vehicle (PHEV) and the like; an electric motorcycle including an electric bike (E-bike) and an electric scooter (E-scooter); an electric golf cart; a power storage system; etc.

Mode for Invention

Hereinafter, preferred examples of the present invention will be described in order to facilitate understanding of the present invention. It will be apparent to those skilled in the art, however, that the following examples are illustrative of the present invention and that various changes and modifications can be made within the scope and spirit of the present invention. Such variations and modifications are within the scope of the appended claims.

EXAMPLES AND COMPARATIVE EXAMPLES

Example 1

A solution prepared by dissolving 1.0 M LiTFSI and 1.0% by weight of lithium nitrate in the organic solvent consisting of 1,3-dioxolane and dimethyl ether (DOL:DME=1:1 (volume ratio)) was prepared, and 0.1% by weight of 1H,1H,2H,2H-perfluorodecanethiol was added to this solution to prepare an electrolyte.

Sulfur was mixed with conductive material and binder in acetonitrile using a ball mill to prepare a slurry of positive electrode active material. At this time, carbon black was used as a conductive material and polyethylene oxide (molecular weight: 5,000,000 g/mol) was used as a binder, and a mixing ratio of sulfur: conductive material: binder was 60:20:20 by weight. The slurry of positive electrode active material was coated on the aluminum current collector and then dried to produce a positive electrode.

A thin film of lithium metal with a thickness of 40 μm was used as a negative electrode.

The prepared positive electrode and negative electrode were placed facing each other, and a polyethylene separator was interposed therebetween. Thereafter, 70 μl of the electrolyte was injected to prepare a coin-type battery.

Example 2

A coin-type battery was manufactured in the same manner as Example 1 above except that in the preparation of the electrolyte, 0.5% by weight of 1H,1H,2H,2H-perfluorodecanethiol was used.

Example 3

A coin-type battery was manufactured in the same manner as Example 1 above except that in the preparation of the electrolyte, the lithium nitrate was not used.

Example 4

A coin-type battery was manufactured in the same manner as Example 1 above except that in the preparation of the electrolyte, 1.0% by weight of 1H,1H,2H,2H-perfluorodecanethiol was used and the lithium nitrate was not used.

Example 5

A coin-type battery was manufactured in the same manner as Example 1 above except that in the preparation of the positive electrode, sulfur:conductive material:binder were mixed at a weight ratio of 70:15:15.

Example 6

A coin-type battery was manufactured in the same manner as Example 1 above except that in the preparation of the electrolyte, 0.5% by weight of 1H,1H,2H,2H-perfluorodecanethiol was used and sulfur:conductive material:binder were mixed at a weight ratio of 70:15:15.

Example 7

A coin-type battery was manufactured in the same manner as Example 1 above except that in the preparation of the positive electrode, sulfur:conductive material:binder were mixed at a weight ratio of 80:10:10.

Example 8

A coin-type battery was manufactured in the same manner as Example 1 above except that in the preparation of the electrolyte, 0.5% by weight of 1H,1H,2H,2H-perfluorodecanethiol was used and sulfur:conductive material:binder were mixed at a weight ratio of 80:10:10.

Example 9

A coin-type battery was manufactured in the same manner as Example 1 above except that in the preparation of the electrolyte, 2,4-difluorothiophenol instead of 1H,1H,2H,2H-perfluorodecanethiol was used in the same amount, and in the preparation of the positive electrode, sulfur:conductive material:binder were mixed at a weight ratio of 80:10:10.

Example 10

A coin-type battery was manufactured in the same manner as Example 1 above except that in the preparation of the electrolyte, 2,4-difluorothiophenol instead of 1H,1H,2H,2H-perfluorodecanethiol was used in the amount of 1.0% by weight, and in the preparation of the positive electrode, sulfur:conductive material:binder were mixed at a weight ratio of 80:10:10.

Example 11

A coin-type battery was manufactured in the same manner as Example 1 above except that in the preparation of the electrolyte, 4-fluorothiophenol instead of 1H,1H,2H,2H-perfluorodecanethiol was used in the same amount, and in the preparation of the positive electrode, sulfur:conductive material:binder were mixed at a weight ratio of 80:10:10.

Example 12

A coin-type battery was manufactured in the same manner as Example 1 above except that in the preparation of the electrolyte, 4-fluorothiophenol instead of 1H,1H,2H,2H-perfluorodecanethiol was used in the amount of 1.0% by weight, and in the preparation of the positive electrode, sulfur:conductive material:binder were mixed at a weight ratio of 80:10:10.

Comparative Example 1

A coin-type battery was manufactured in the same manner as Example 1 above except that in the preparation of the electrolyte, 1H,1H,2H,2H-perfluorodecanethiol was not used.

Comparative Example 2

A coin-type battery was manufactured in the same manner as Example 1 above except that in the preparation of the electrolyte, 1H,1H,2H,2H-perfluorodecanethiol and lithium nitrate were not used.

Comparative Example 3

A coin-type battery was manufactured in the same manner as Example 1 above except that in the preparation of the electrolyte, 1H,1H,2H,2H-perfluorodecanethiol was not used, and in the preparation of the positive electrode, sulfur:conductive material:binder were mixed at a weight ratio of 75:15:15.

Comparative Example 4

A coin-type battery was manufactured in the same manner as Example 1 above except that in the preparation of the electrolyte, 1H,1H,2H,2H-perfluorodecanethiol was not used, and in the preparation of the positive electrode, sulfur:conductive material:binder were mixed at a weight ratio of 80:10:10.

Experimental Example 1. Evaluation of Battery Performance

The batteries manufactured in the above Examples and Comparative Examples were repeatedly discharged and charged 2.5 times at a current density of 0.1 C and then charged and discharged three times each at a current density of 0.2 C, and thereafter were checked for the performance of the batteries while cycling at a current density of 0.3 C (charging) and 0.5 C (discharging). The results thus obtained are shown in FIGS. 1 to 6.

Referring to FIGS. 1 to 6, it is identified that the capacity and life characteristics of the batteries including the electrolytes of the Examples according to the invention are superior to those of the batteries including the electrolytes of the Comparative Examples.

Specifically, it is seen from FIG. 1 that specific capacities and life characteristics are improved for Examples 1 and 2 as compared to Comparative Example 1 which comprises the electrolyte without the additive, 1H,1H,2H,2H-perfluorodecanethiol. Particularly, it is identified that in the case of Example 1, as the specific capacity is stably maintained up to 90 cycles, the life is increased by about 50% compared to Comparative Example 1.

Figure 2:
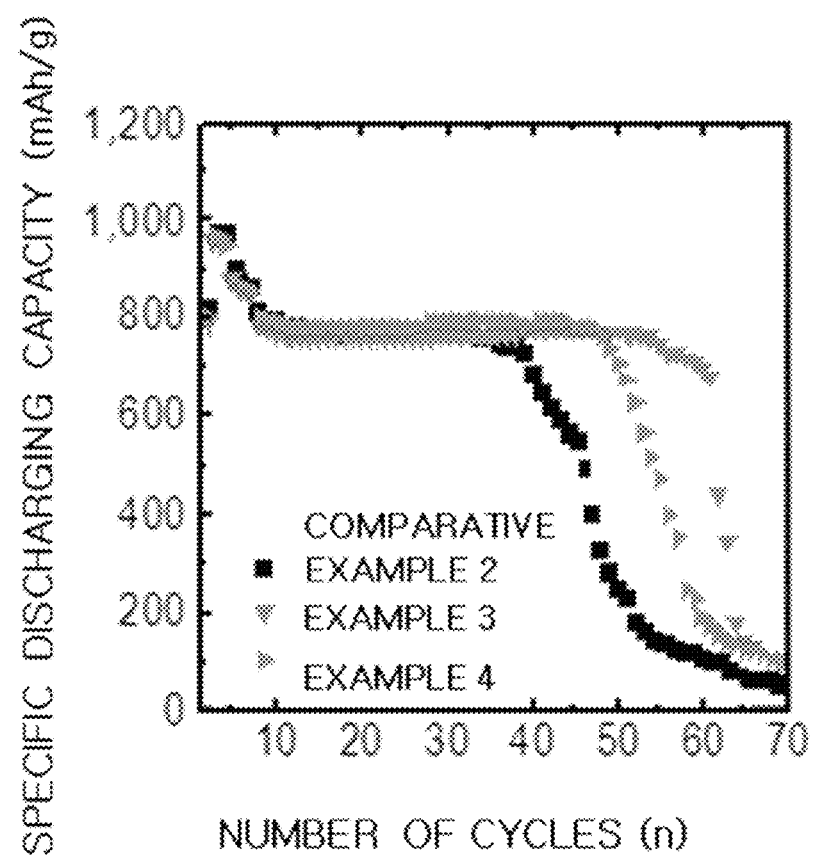
FIG. 2 is a graph showing the results of performance evaluations of the batteries manufactured in Example 3 and Example 4 of the present invention and Comparative Example 2.

It is seen from FIG. 2 that the specific capacity of the battery comprising the electrolyte of Examples 3 and 4 which is the case of using the electrolyte without containing a nitric acid-based compound is higher than that of Comparative Example 2 which does not use the additive in the electrolyte. Also, it is identified that when comparing with Comparative Example 2 in which the specific capacity is maintained for about 40 cycles, Examples 3 and 4 including the electrolyte according to the present invention are stably maintained for 50 cycles or more to further improve capacity retention and life characteristics.

Figure 3:
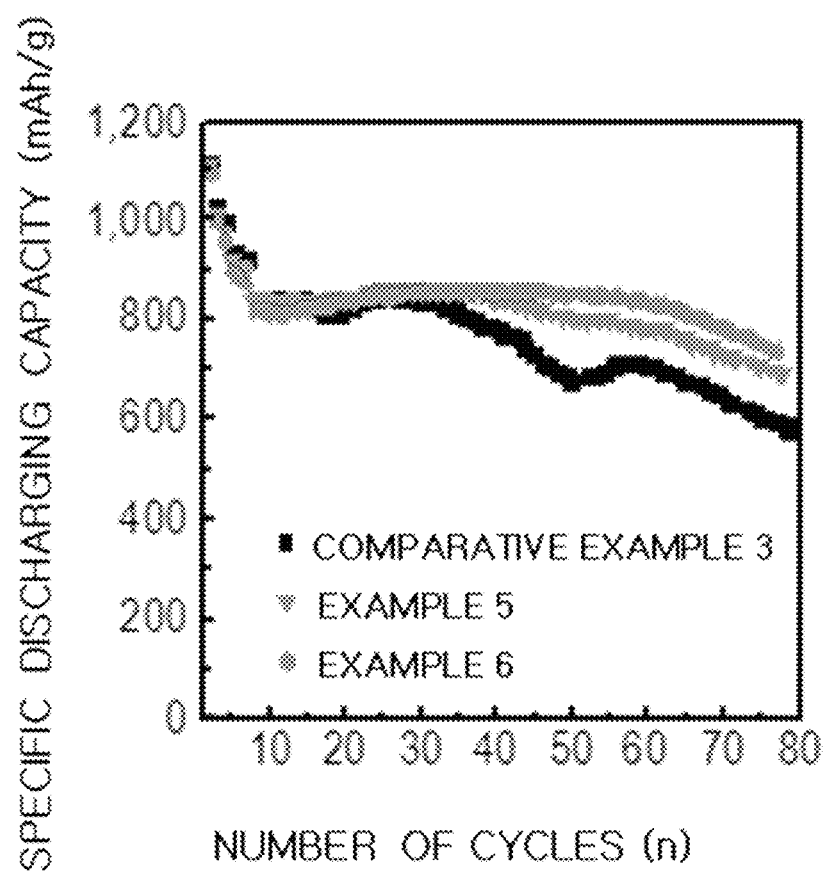
FIG. 3 is a graph showing the results of performance evaluations of the batteries manufactured in Example 5 and Example 6 of the present invention and Comparative Example 3.
Figure 4:
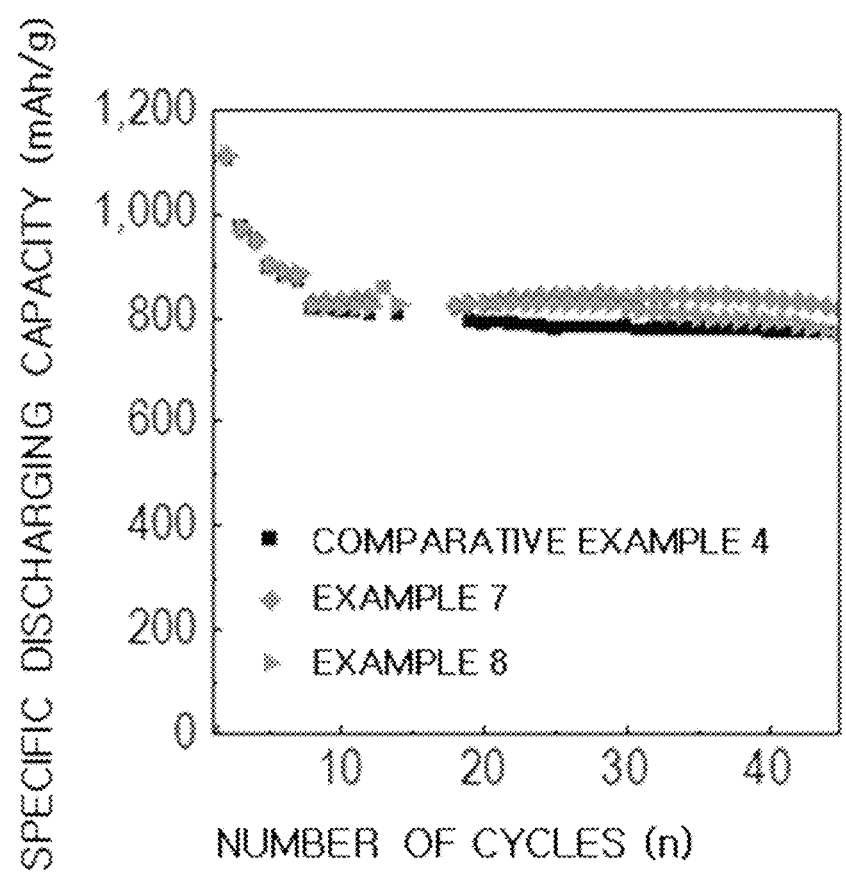
FIG. 4 is a graph showing the results of performance evaluations of the batteries manufactured in Example 7 and Example 8 of the present invention and Comparative Example 4.

Each of FIGS. 3 and 4 show a case where the composition of the positive electrode active material is different. It is seen that the batteries of Examples 5, 6, 7 and 8 using the electrolyte containing the additive have improved specific capacity and life characteristics compared to Comparative Examples 3 and 4.

Figure 5:
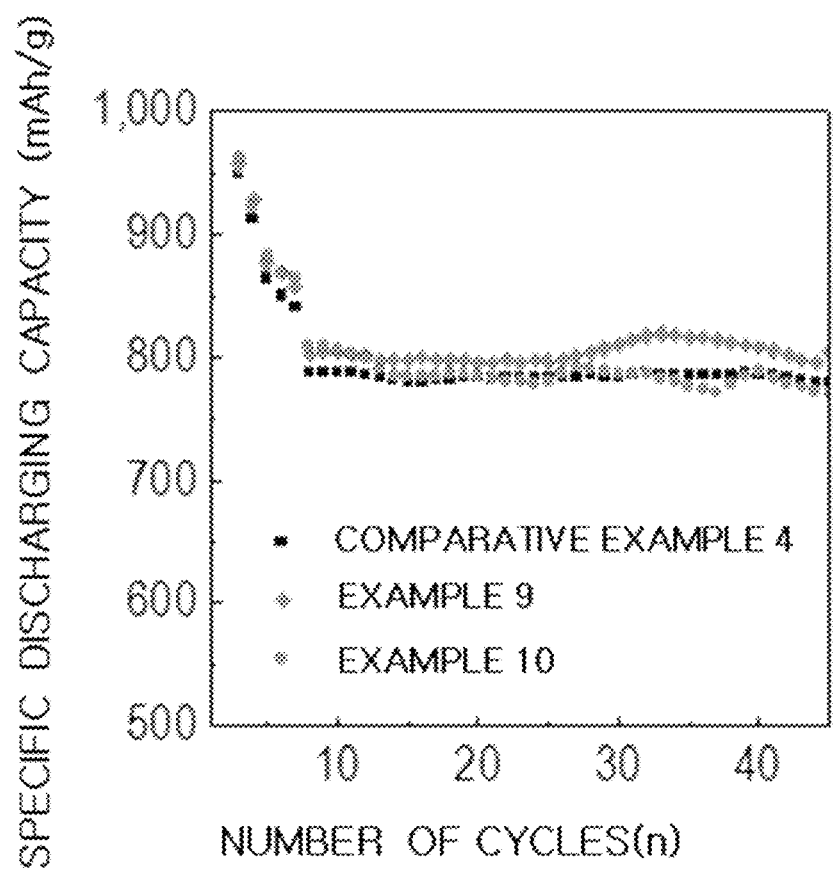
FIG. 5 is a graph showing the results of performance evaluations of the batteries manufactured in Example 9 and Example 10 of the present invention and Comparative Example 4.
Figure 6:
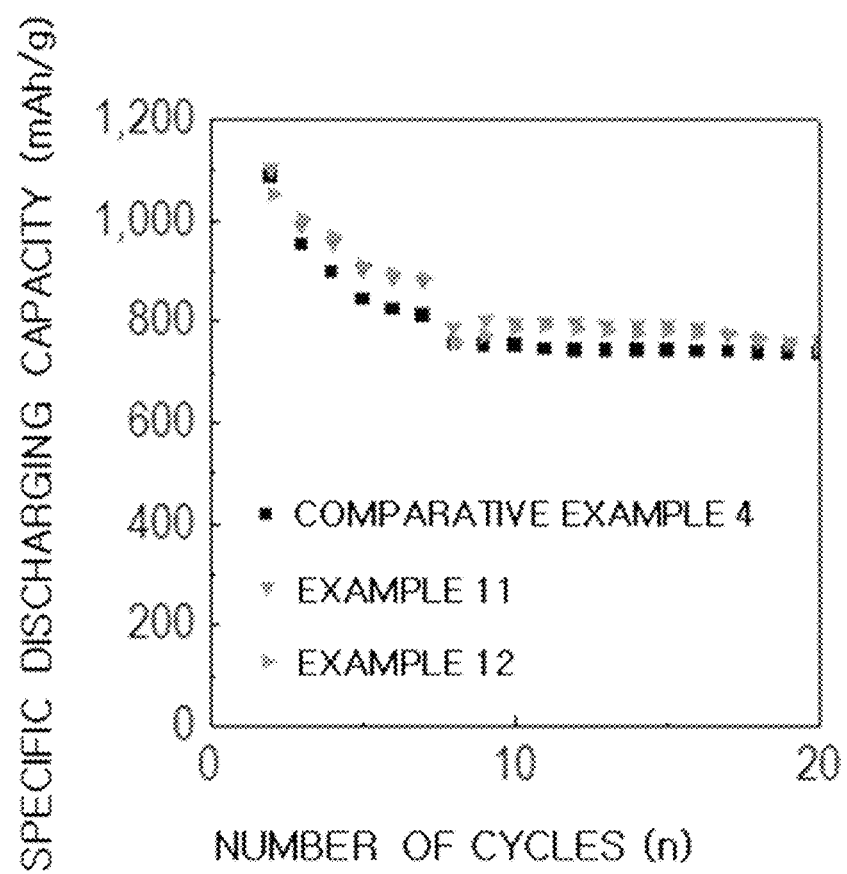
FIG. 6 is a graph showing the results of performance evaluations of the batteries manufactured in Example 11 and Example 12 of the present invention and Comparative Example 4.

Each of FIGS. 5 and 6 show a case where the kind of additive is different. It is identified that the batteries of Examples 9, 10, 11, and 12 using the electrolyte containing each additive have improved capacity and life characteristics compared to Comparative Example 4.

The invention claimed is:

1. An electrolyte for a lithium metal battery comprising:
a lithium salt;
an organic solvent; and
an additive,
wherein the additive comprises at least one selected from the group consisting of 1H,1H,2H,2H,3H,3H-perfluoroundecylthiol, 1H,1H,2H,2H-perfluorodecanethiol, 1H,1H,2H,2H-perfluorononanethiol, 1H,1H,2H,2H-perfluoro-1-octanethiol, 1H,1H-perfluorooctylthiol, 1H,1H-perfluoropropylthiol, 2,2,2-trifluoroethanethiol, 1H,1H,2H,2H-perfluoro-1-hexanethiol, 2,3,5,6-tetrafluorobenzenethiol, 2-(trifluoromethoxy)thiophenol, 3-(trifluoromethoxy)thiophenol, 2-(trifluoromethyl)benzenethiol, 2,6-difluorobenzyl mercaptan, 3,4-difluorobenzyl mercaptan, 3,5-difluorobenzyl mercaptan, 4-fluorobenzyl mercaptan, 3,5-bis(trifluoromethyl)benzenethiol, 4-trifluoromethylbenzyl mercaptan, 4-(1H,1H,2H,2H-perfluorodecyl)benzylamine, 3,3,3-trifluoropropylamine, 4-fluoro-α-methylbenzyl alcohol, 2-fluoro-3-methylbenzyl alcohol, 4-fluoro-3-methylbenzyl alcohol, 5-fluoro-2-methylbenzyl alcohol, 4-fluoro-3-nitrobenzyl alcohol, 2-fluoro-5-nitrobenzyl alcohol, 2-fluoro-3-(trifluoromethoxy)benzyl alcohol, 2-fluoro-3-nitrobenzyl alcohol, 2-fluoro-5-methoxybenzyl alcohol, 3-fluoro-5-(trifluoromethyl)benzyl alcohol, 3-fluoro-5-methoxybenzyl alcohol, 4-fluoro-3-(trifluoromethyl)benzyl alcohol, 4-fluoro-3-methoxybenzyl alcohol, 5-fluoro-2-(trifluoromethyl)benzyl alcohol, 5-fluoro-2-nitrobenzyl alcohol, DL-4-fluoro-α-propylbenzyl alcohol, 3-fluorobenzyl alcohol and 4-fluorophenethyl alcohol.

2. The electrolyte for the lithium metal battery according to claim 1, wherein the additive is present in an amount of from 0.01% by weight to 5% by weight, based on a total weight of the electrolyte for the lithium metal battery.

3. The electrolyte for the lithium metal battery according to claim 1, wherein the lithium salt comprises at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, lithium chloroborane, lithium lower aliphatic carboxylate having 4 or less carbon atoms, 4-phenyl lithium borate and lithium imide.

4. A lithium metal battery comprising:
a positive electrode comprising a positive electrode active material;
a negative electrode comprising lithium metal or lithium alloy; and
the electrolyte according to claim 1.

5. The lithium metal battery according to claim 4, wherein the positive electrode active material comprises at least one selected from the group consisting of an elemental sulfur and a sulfur-containing compound.

6. A lithium metal battery comprising:
a positive electrode comprising a positive electrode active material;
a negative electrode comprising lithium metal or lithium alloy; and
an electrolyte;
wherein the electrolyte comprises:
a lithium salt;
an organic solvent; and
an additive,
wherein the additive comprises at least one selected from the group consisting of 1H,1H,2H,2H,3H,3H-perfluoroundecylthiol, 1H,1H,2H,2H-perfluorodecanethiol, 1H,1H,2H,2H-perfluorononanethiol, 1H,1H,2H,2H-perfluoro-1-octanethiol, 1H,1H-perfluorooctylthiol, 1H,1H-perfluoropropylthiol, 2,2,2-trifluoroethanethiol, 1H,1H,2H,2H-perfluoro-1-hexanethiol, 2,3,4,5,6-pentafluorothiophenol, 2,3,5,6-tetrafluorobenzenethiol, 2,4-difluorothiophenol, 3,4-difluorothiphenol, 2-(trifluoromethoxy)thiophenol, 3-(trifluoromethoxy)thiophenol, 2-(trifluoromethyl)benzenethiol, 2,6-difluorobenzyl mercaptan, 3,4-difluorobenzyl mercaptan, 3,5-difluorobenzyl mercaptan, 4-fluorobenzyl mercaptan, 3,5-bis(trifluoromethyl)benzenethiol, 4-trifluoromethylbenzyl mercaptan, 4-(1H, 1H,2H,2H-perfluorodecyl)benzylamine, 3,3,3-trifluoropropylamine, 4-fluoro-α-methylbenzyl alcohol, 2-fluoro-3-methylbenzyl alcohol, 4-fluoro-3-methylbenzyl alcohol, 5-fluoro-2-methylbenzyl alcohol, 4-fluoro-3-nitrobenzyl alcohol, 2-fluoro-5-nitrobenzyl alcohol, 2-fluoro-3-(trifluoromethoxy)benzyl alcohol, 2-fluoro-3-nitrobenzyl alcohol, 2-fluoro-5-methoxybenzyl alcohol, 3-fluoro-5-(trifluoromethyl)benzyl alcohol, 3-fluoro-5-methoxybenzyl alcohol, 4-fluoro-3-(trifluoromethyl)benzyl alcohol, 4-fluoro-3-methoxybenzyl alcohol, 5-fluoro-2-(trifluoromethyl)benzyl alcohol, 5-fluoro-2-nitrobenzyl alcohol, DL-4-fluoro-α-propylbenzyl alcohol, 3-fluorobenzyl alcohol and 4-fluorophenethyl alcohol.

7. The lithium metal battery according to claim 6, wherein teh additive is present in an amount of from 0.01% by weigth to 5% by weight, based on a total weight of the electrolyte for the lithium metal battery.

8. The lithium metal battery according to claim 6, wherein the lithium salt comprises at least one selected from the group consisiting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSBF$_6$, LiAlCl$_4$, CH$_3$SO$_3$Li, CF$_3$SO$_3$Li, (CF$_3$SO$_2$)$_2$ NLi, (C$_2$F$_5$SO$_2$)$_2$NLi, SO$_2$F)$_2$NLi, (CF$_3$SO$_2$)$_3$CLi, lithium chloroborane, lithium lower aliphatic carboxylate having 4 or less carbon atoms, 4-phenyl lithium borate and lithium imide.

9. The lithium metal battery according to claim 6, wherein the positive electrode active material comprises at least one selected from the group consisting of an elemental sulfur and a sulful-containing compound.

\* \* \* \* \*